(12) United States Patent
Prebble

(10) Patent No.: US 10,579,707 B2
(45) Date of Patent: Mar. 3, 2020

(54) METHOD FOR INFERRING BLOCKS OF TEXT IN ELECTRONIC DOCUMENTS

(71) Applicant: Konica Minolta Laboratory U.S.A., Inc., San Mateo, CA (US)

(72) Inventor: Tim Prebble, Longmont, CO (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 172 days.

(21) Appl. No.: 15/859,152

(22) Filed: Dec. 29, 2017

(65) Prior Publication Data
US 2019/0205362 A1   Jul. 4, 2019

(51) Int. Cl.
| G06F 17/21 | (2006.01) |
| G06K 9/00 | (2006.01) |
| G06N 20/00 | (2019.01) |
| G06F 17/22 | (2006.01) |

(52) U.S. Cl.
CPC ........ *G06F 17/211* (2013.01); *G06F 17/2229* (2013.01); *G06F 17/2241* (2013.01); *G06K 9/00463* (2013.01); *G06N 20/00* (2019.01); *G06F 17/2294* (2013.01)

(58) Field of Classification Search
CPC .............. G06F 17/211; G06F 17/2294; G06F 17/2229; G06F 17/2241; G06K 9/00463; G06N 20/00
See application file for complete search history.

(56) References Cited

U.S. PATENT DOCUMENTS

| 5,680,479 A * | 10/1997 | Wang ................ G06K 9/00456 382/171 |
| 7,020,838 B2 * | 3/2006 | Tsykora ................ G06F 17/212 715/241 |
| 7,876,471 B2 * | 1/2011 | Tojo .................... G06K 9/00463 358/1.18 |
| 7,890,486 B2 * | 2/2011 | Claghorn ................ G06F 16/93 707/705 |
| 8,165,974 B2 * | 4/2012 | Privault .................. G06N 5/043 706/12 |
| 8,261,186 B2 * | 9/2012 | Mansfield ............. G06F 17/211 715/234 |
| 8,965,127 B2 * | 2/2015 | Wu ........................ G06K 9/348 382/173 |
| 9,189,473 B2 * | 11/2015 | Galle .................. G06F 17/2795 |
| 9,336,302 B1 * | 5/2016 | Swamy ............... G06F 16/2465 |
| 9,569,327 B2 * | 2/2017 | Singh .................. G06F 11/3013 |
| 9,607,023 B1 * | 3/2017 | Swamy ............... G06F 16/2465 |
| 9,614,984 B2 * | 4/2017 | Matsutani .......... H04N 1/00241 |
| 10,318,503 B1 * | 6/2019 | Swamy ............... G06F 16/2465 |
| 2004/0049735 A1 * | 3/2004 | Tsykora ................ G06F 17/212 715/234 |

(Continued)

*Primary Examiner* — Maikhanh Nguyen
(74) *Attorney, Agent, or Firm* — Osha Liang LLP

(57) ABSTRACT

A method for processing an electronic document with characters includes adjusting the characters to identify lines and words; generating a cluster encompassing all of the lines and the words; setting the cluster as a target; determining whether the target can be divided; in response to determining that the target can be divided, dividing the target into a first plurality of sub-clusters; identifying blocks of text based on the first sub-clusters; and generating a new electronic document with paragraphs and sections based on the blocks of text.

20 Claims, 7 Drawing Sheets

(56) References Cited

U.S. PATENT DOCUMENTS

| | | | | |
|---|---|---|---|---|
| 2008/0040664 A1* | 2/2008 | Bera | ............... | G06F 17/24 |
| | | | | 715/272 |
| 2009/0043824 A1* | 2/2009 | Claghorn | ............ | G06F 16/93 |
| 2010/0174977 A1* | 7/2010 | Mansfield | ........... | G06F 17/211 |
| | | | | 715/234 |
| 2010/0312725 A1* | 12/2010 | Privault | ............ | G06N 5/043 |
| | | | | 706/12 |
| 2011/0243444 A1* | 10/2011 | Mitic | ................. | G06K 9/342 |
| | | | | 382/176 |
| 2013/0050765 A1* | 2/2013 | Zhan | ............... | G06K 9/00463 |
| | | | | 358/3.01 |
| 2013/0124474 A1* | 5/2013 | Anderson | ........... | G06F 16/285 |
| | | | | 707/634 |
| 2013/0311467 A1* | 11/2013 | Galle | ................ | G06F 17/278 |
| | | | | 707/737 |
| 2014/0095144 A1* | 4/2014 | Singh | ............... | G06F 11/3013 |
| | | | | 704/2 |
| 2014/0270526 A1* | 9/2014 | Wu | .................. | G06K 9/348 |
| | | | | 382/177 |
| 2014/0372102 A1* | 12/2014 | Hagege | ............. | G06F 17/278 |
| | | | | 704/9 |
| 2015/0127323 A1* | 5/2015 | Jacquet | ............. | G06F 17/271 |
| | | | | 704/9 |
| 2016/0180163 A1* | 6/2016 | Ming | ................ | G06K 9/00463 |
| | | | | 382/164 |
| 2017/0300565 A1* | 10/2017 | Calapodescu | ....... | G06F 16/353 |
| 2018/0088747 A1* | 3/2018 | Grams | ............. | G06K 9/00469 |

* cited by examiner

METHOD FOR INFERRING BLOCKS OF TEXT IN ELECTRONIC DOCUMENTS

BACKGROUND

An electronic document may include characters (e.g., text and non-text objects) composed of numbers, letters, or the like. For example, the electronic document may be a scan of a page. As another example, the electronic document may be a photograph of a person's writing with characters. These characters are rarely organized in a format that is easy to read or manipulate in page description languages, making it difficult for text processing devices to determine the geometry of the group of characters. This formatting can also make it difficult to generate a high-level representation of the characters that can be included in an electronic document (e.g., word processing document, spreadsheet, slide show, webpage, etc.). Regardless, users still wish to have text processing devices that easily read (recognize) and manipulate characters in an electronic document.

SUMMARY

One or more embodiments of the invention provide a method for processing an electronic document including characters. The method comprises: adjusting the characters to identify lines and words; generating a cluster encompassing all of the lines and the words; setting the cluster as a target; determining whether the target can be divided; in response to determining that the target can be divided, dividing the target into a first plurality of sub-clusters; identifying blocks of text based on the first sub-clusters; and generating a new electronic document with paragraphs and sections based on the blocks of text.

One or more embodiments of the invention provide a non-transitory computer readable medium (CRM) storing computer readable program code for processing an electronic document including characters, wherein the program code causes a computer to execute: adjusting the characters to identify lines and words; generating a cluster encompassing all of the lines and the words; setting the cluster as a target; determining whether the target can be divided; in response to determining that the target can be divided, dividing the target into a first plurality of sub-clusters; identifying blocks of text based on the first sub-clusters; and generating a new electronic document with paragraphs and sections based on the blocks of text.

One or more embodiments of the invention provide a system for image processing that comprises: a memory; and a processor connected to the memory that: adjusts the characters to identify lines and words; generates a cluster encompassing all of the lines and the words; sets the cluster as a target; determines whether the target can be divided; in response to determining that the target can be divided, divides the target into a first plurality of sub-clusters; identifies blocks of text based on the first sub-clusters; and generates a new electronic document with paragraphs and sections based on the blocks of text.

Other aspects of the invention will be apparent from the following description and the appended claims.

DETAILED DESCRIPTION

Figure 1:
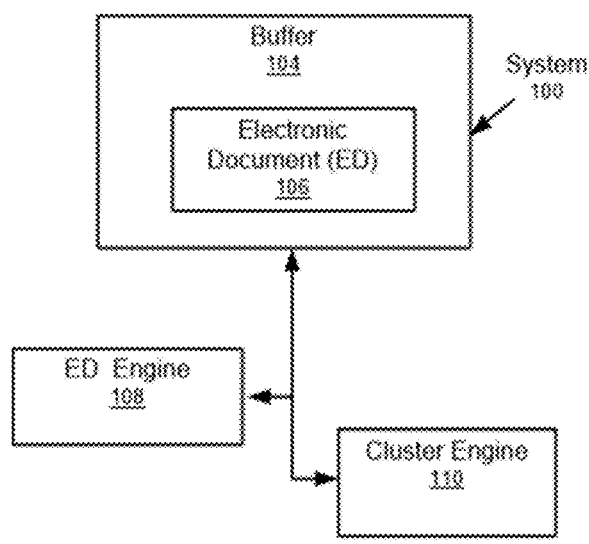
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system of electronic document (ED) processing that improves readability and/or manipulation (i.e., copying, pasting, and the like) of characters in an ED. Specifically, an ED (e.g., PDF, PDL, PCL, JPEG, PNG, TIFF, PPM, etc.) including characters (which may be readable or non-readable) arranged in lines is obtained. The ED is processed to identify readable blocks of text (e.g., paragraphs, titles, headings, sub-headings, text within tables, etc.) including all the characters present in the ED. With each of the blocks of text identified, a high-level representation of the ED that includes the paragraphing and sectioning of the characters may be generated as an OOXML document.

FIG. 1 shows a system (100) in accordance with one or more embodiments of the invention. As shown in FIG. 1, the system (100) has multiple components, including, for example, a buffer (104), an ED engine (108), and a cluster engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an ED (106) including one or more text and/or non-text graphics (e.g., a table, a graph, a text character, a shape, etc.) that make up paragraphs or sections within the ED. The ED (106) may be obtained (e.g., downloaded, scanned, etc.) from any source. Further, the ED (106) may be of any size and in any format (e.g., PDL, PDF, JPEG, GIF, BMP, PNG, etc.).

In one or more embodiments of the invention, the ED engine (108) may be implemented in hardware (i.e., circuitry), software, or any combination thereof. Once the ED is obtained, the ED engine (108) adjusts the characters therein. The characters are adjusted through insertion of whitespace characters (e.g. \s and \n) (hereinafter referred to as "spaces") in the ED to allow the cluster engine (110) to create clusters used to identify blocks of text. As it will be described in the following figures, the ED engine (108) may be a specialized component of the system (100) that interprets an ED in accordance with instructions in the system. The instructions can be preset or established by a user or a secondary system while the system (100) is being implemented.

In one or more embodiments of the invention, the cluster engine (110) may be implemented in hardware (i.e., circuitry), software, or any combination thereof. The cluster engine (110) defines the size and shape of the clusters as well as the number of clusters and sub-clusters in an ED. In one or more embodiments, the ED engine and the cluster engine collaborate to create the blocks of text based on the size of the ED and the geometries therein.

Figure 2A:
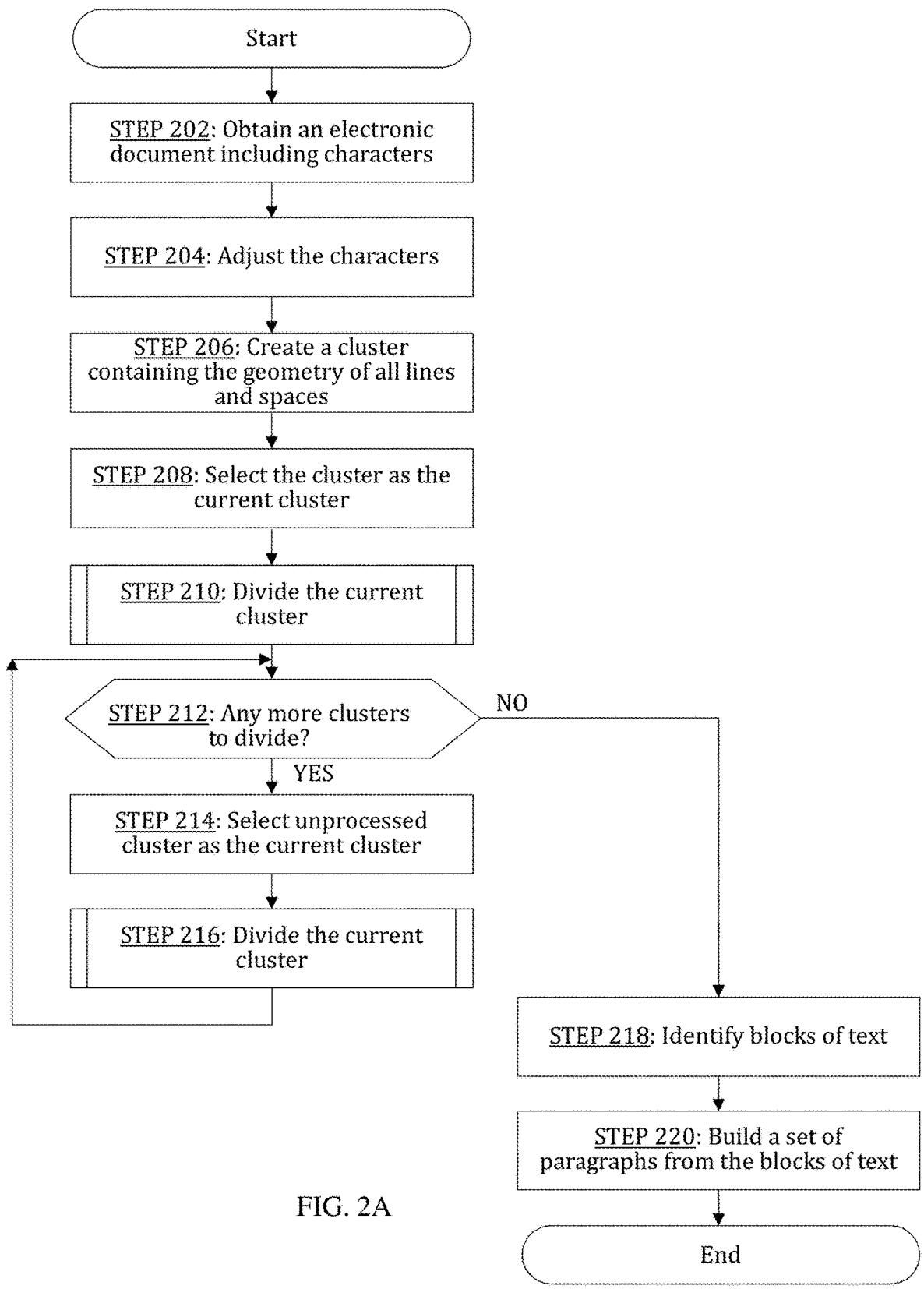
FIGS. 2A-2B show flowcharts in accordance with one or more embodiments of the invention.
Figure 2B:
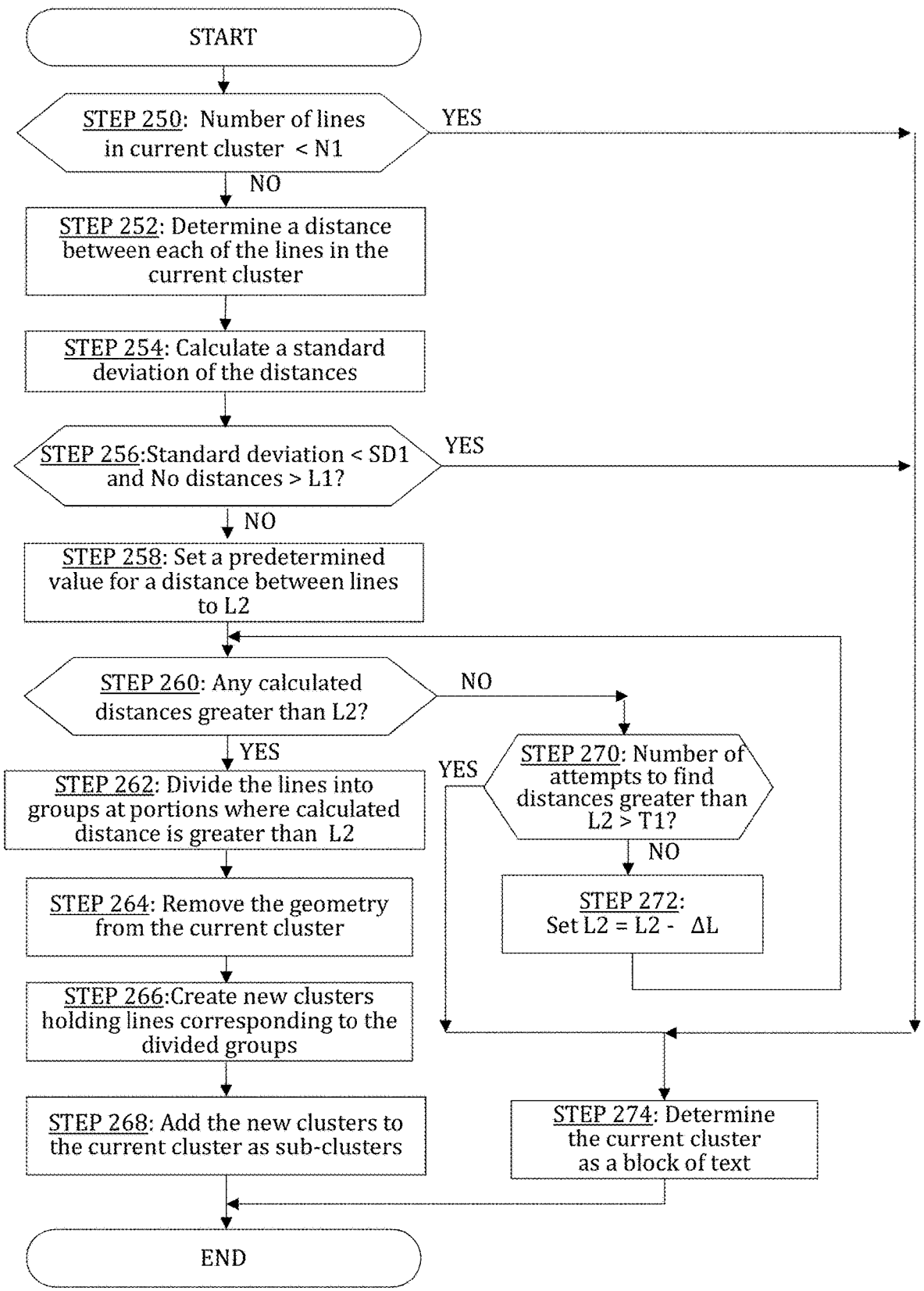

FIGS. 2A-2B show a flowchart in accordance with one or more embodiments of the invention. The flowchart depicts a process for ED processing. Specifically, the flowchart depicts a process for detecting blocks of text in an ED and includes paragraphing and sectioning of characters that make up the block of text. One or more of the steps in FIGS. 2A-2B may be performed by the components of the system (100), discussed above in reference to FIG. 1. In one or more embodiments of the invention, one or more of the steps shown in FIG. 2A-2B may be omitted, repeated, and/or performed in a different order than the order shown in FIG. 2A-2B. Accordingly, the scope of the invention should not be considered limited to the specific arrangement of steps shown in FIG. 2A-2B.

In one or more embodiments as shown in FIG. 2A, an electronic document (ED) is obtained. The ED is scanned, and a general visualization of the characters in the ED is obtained. The characters in the ED are then recognized, adjusted, and grouped in clusters. Based on preset parameters, a cluster can be divided into sub-clusters. Each of these processes may be performed on one or more characters at the discretion of the user. In one or more embodiments, the characters obtained are processed to create blocks of text. Each of the steps required to create the blocks of text are discussed below.

In STEP 202 according to one or more embodiments of the invention, an ED containing characters is obtained. This, for example, makes the ED available to the ED engine and the rest of the system. The ED can be made available, directly or indirectly, by the user. That is, the user can start the method voluntarily or involuntarily. The EDs can be obtained from a secondary system running alongside locally or through a network. The EDs can also be obtained by a process triggered by a secondary user locally or remotely through a network. The system can be adapted to receive the ED or to search for it. This step may be performed by the ED engine (108) as described above in reference to FIG. 1.

In STEP 204 according to one or more embodiments of the invention, characters in the ED are adjusted. Here, spaces are added as needed to separate the characters into words and lines. In one or more embodiments, the characters are identified as elements and this information is saved into memory. In one or more embodiments, element(s) may include alphanumeric characters, special characters or symbols, and languages other than English. This step may be performed by the ED engine (108) as described above in reference to FIG. 1.

In STEP 206 according to one or more embodiments of the invention, a cluster is generated. A cluster is the combination of elements within the ED. Specifically, the cluster includes all elements that are readable and can be understood upon linear succession. The cluster can be made from elements organized left to right, right to left, up to down, or any combination thereof. The cluster is generated when a collection of words and lines are identified in consecutive succession. This step may be performed by the cluster engine (110) as described above in reference to FIG. 1.

In one or more embodiments, the cluster has a geometry. A geometry may be the visual representation of a given group of lines and words as adjusted for the cluster. Once the spaces have been added, the position of these elements within the ED can be identified. In this non-limiting example, a geometry enables the reader to understand the position of the characters and improves readability. In one or more embodiments, the position of the cluster is the visual location of the cluster identified in relation to the visual representation of the elements in the ED.

For instance, in the case of the ED being a single page, the cluster and its position can be identified in relation to the margins of the page. This position and its shape would define the geometry of this cluster. This non-limiting example serves to represent how the position of a cluster can be identified and does not represent the only type of ED processing that the method can perform.

For instance, in the case of the ED being an image, the cluster can be identified in relation to the corners of the image. This position and its shape would be the geometry of the cluster. This non-limiting example serves to represent how the position of a cluster can be identified and does not represent the only type of ED processing that the method can perform.

In STEP 208 according to one or more embodiments, the cluster created in STEP 206 is selected as a target. The method according to one or more embodiments uses the target and its geometry. That is, a cluster is no longer a target after the geometry is no longer associated with the cluster. This step may be performed by the cluster engine (110) as described above in reference to FIG. 1.

In STEP 210 according to one or more embodiments the target is divided into sub-clusters. This step is explained in further detail below, with reference to FIG. 2B. That description will include the process of dividing the target and the requirements needed to identify and determine the creation of sub-clusters. This step may be performed by the cluster engine (110) as described above in reference to FIG. 1.

In STEP 212 according to one or more embodiments, after the target is divided in STEP 210, a determination is made as to whether there are more clusters to divide. At this point, groups of characters that have not been a target before are processed. These groups of characters are referred to as unprocessed clusters. There will be no unprocessed clusters after the entirety of the ED has been adjusted and divided into sub-clusters. At this point in the method, all clusters might have been assigned as a target at some point. This step may be performed by the cluster engine (110) as described above in reference to FIG. 1.

In STEP 214 according to one or more embodiments, in response to the target being divided in STEP 210 and after it has been determined that there are more clusters to divide in STEP 212, one of the unprocessed clusters is selected as the target. This step may be performed by the cluster engine (110) as described above in reference to FIG. 1.

In one or more embodiments, in response to STEP 214, the new target is divided. As it will be explained in more detail in FIG. 2B, this new target will follow a similar process of being divided in accordance with STEP 210 in a recursive manner until all unprocessed clusters have been labeled as targets in similarity to STEP 214. This step may be performed by the cluster engine (110) as described above in reference to FIG. 1.

In STEP 218 according to one or more embodiments, in response to the target being divided in STEP 210 and after it has been determined that there are no more clusters to divide in STEP 212, all of the processed clusters are selected to identify likely blocks of text. The blocks of text are identified as a result of the processed clusters which includes all clusters that have been determined to be targets and the sub-clusters that accompanied them. All these clusters rely on their associated geometries for the cluster engine (110) to generate them within the ED as described above. It is through the process of pairing geometries with the processed clusters that blocks of text can be identified. This step may be performed by the cluster engine (110) as described above in reference to FIG. 1.

Examples of identified blocks of text will be presented in detail below with reference to FIGS. 4-6. These non-limiting examples rely on different visual representations to demonstrate some of the vast range of EDs including characters that can be processed through the method.

In STEP 220 according to one or more embodiments, a set of paragraphs is built from the blocks of text. The set of paragraphs is represented by the blocks of text processed. The paragraphs have a position on the ED according to their geometry. The spaces added in STEP 202 help define a geometry as described above. This geometry and the position therein is further modified as needed to place the set of paragraph in a new position that increases readability and understanding of the characters therein. This step may be performed by the ED engine (108) in collaboration with the cluster engine (110) as described above in reference to FIG. 1.

The method ends all processes as there are no more unprocessed clusters in the ED.

The system and the method of one or more embodiments as presented in FIGS. 1 and 2A can be followed by another application or tool that uses the blocks of text as needed by the user. This other application or tool an run alongside the method described and retrieve the status of the method of one or more embodiments.

In one non-limiting representation of one or more embodiments, the other application or tool may be a language processing device that translates words from one language to another. This language processing device may provide an original ED in any language to the method of one or more embodiments to build a set of paragraphs. The language processing device may pause the current method after the characters are adjusted in STEP 204 to retrieve the original ED for translation. After the original ED has been translated, the language processing device may replace the original electronic ED by the translated ED for the method described to create clusters in accordance with STEP 206.

In one non-limiting representation of one or more embodiments, the another application or tool may be an image processing device (e.g., a multifunction peripheral) that identifies whether text is present or not on images. This image processing device may provide an original ED in any language to the system described to build blocks of text and to create a set of paragraphs. The image processing device may pause the current method after the characters are adjusted in STEP 204 to retrieve the original ED to process the characters searching for text. After the original ED has been searched for text, the image processing device may skip to the end of the method described. Alternatively, the image processing device may continue with STEP 206 to build a set of paragraphs.

FIG. 2B shows a flowchart (2) in accordance with one or more embodiments of the invention. This flowchart describes STEP 210 and STEP 216 in more detail. As can be seen, the method according to one or more embodiments further divides the target into sub-clusters and identifies the geometries of the sub-clusters as derived from the target; divides and identifies sub-clusters; adds and determines geometries; calculates and assigns the geometry to a set of measure-related values; and calculates, sets, compares, and stores the measure-related values. Each of these processes may be performed on one or more characters to the discretion of the user. For example, one or more embodiments provide the advantage that the characters obtained by the method are processed to the target into sub-clusters. Each of the processes required to divide a main cluster are discussed below.

In STEP 250 according to one or more embodiments of the invention, the number of lines identified in the main cluster is compared to a predetermined value N1. This predetermined value N1 provides a starting point to measure a minimum of lines required to form a paragraph. This step may be performed by the cluster engine (110) as described above in reference to FIG. 1.

In a non-limiting example, this predetermined value N1 is set to 3 lines. The value measured is compared to the pre-set value as described above, and in the event the value is less than the pre-set value N1, the method proceeds to determine that the target is a block of text as denoted by STEP 274. In the event that the value is not determined to be less than the pre-set value N1, the method proceeds to determine the distances between the lines as denoted by STEP 252. These lines are determined based on the geometry allocated for the cluster of characters. This value measured is recorded for future use.

In STEP 252 according to one or more embodiments, to determine the distances between the lines, the actual measurable distance between the lines of characters in the target in relation to its current geometry is determined. This measured distance is a numeric representation dependent on the format of the ED being used.

In STEP 254 according to one or more embodiments of the invention, the standard deviation of the distances recorded is calculated. The standard deviation can be calculated by any means known. In the method, the standard deviation depends on an arithmetic mean of the measured distances. The calculated standard deviation is recorded for future use. This step may be performed by the cluster engine (110) as described above in reference to FIG. 1.

In STEP 256 according to one or more embodiments of the invention, the calculated standard deviation is compared with a predetermined standard deviation SD1 and compares the distances in the target to a predetermined distance length L1. In the event that the calculated standard deviation is less than the predetermined standard deviation SD1 and the distances in the target are all less than the predetermined distance length L1, the method proceeds to STEP 274. Otherwise, the process proceeds to STEP 258. In one or more embodiments, the predetermined standard deviation SD1 and the predetermined distance length L1 are determined based on the geometry allocated for the cluster of characters. For example, assume that the predetermined distance L1 is considered to be an upper bound of a distance (i.e., a gap) between the lines. A gap between the lines may be considered reasonably small if the gap is within this upper bound. This step may be performed by the cluster engine (110) as described above in reference to FIG. 1.

In STEP 258 according to one or more embodiments of the invention, a new predetermined distance length L2 is set based on the value of predetermined length L1. In one or more embodiments, the new predetermined distance length L2 is initially set to have the same value as the predetermined length L1.

In STEP 260 according to one or more embodiments, a distance larger than the predetermined distance length L2 (herein referred to as "the distance length L2) is found. This includes measuring the distances once again to identify a larger distance. In the event that a larger value is identified, the method proceeds to divide the lines into groups at the points where the distances between words is higher than the distance length L2 as denoted by STEP 262. In the event that a smaller value is identified, the method proceeds to determining if the number of times a larger number has been searched as denoted by STEP 270.

In STEP 262 according to one or more embodiments, the lines are divided into groups at the point where the distance between lines is larger than the distance length L2. To divide the lines refers to separating the target into smaller versions of sections. These sections contain unique fragments of the original cluster. This step in the method does not copy or reproduce the main cluster in any way. It identifies the values of distances between lines and separates them according to the distance length L2 and the relation to this one established before. The groups created as a result are not sub-clusters on their own but mere sections of the main cluster as defined above. These sections altogether hold the geometry of the main cluster at this point. They are neither unprocessed cluster nor targets of their own. This step may be performed by the ED engine (108) in collaboration with the cluster engine (110) as described above in reference to FIG. 1.

In STEP 264 according to one or more embodiments, the geometry of the target is removed. To remove the geometry from the target, as per the definitions set forth previously, renders the cluster as a processed cluster. This processed cluster is recorded along with its sections from STEP 262. This step may be performed by the cluster engine (110) as described above in reference to FIG. 1.

In STEP 266 according to one or more embodiments, new clusters are created from the groups created from the last target divided. To create new clusters from the last main cluster includes the lines, spaces and characters contained in each fragment group. These new clusters are not targets. The new clusters also lack a geometry of their own given that it was removed from them as a whole in STEP 264. This step may be performed by the cluster engine (110) as described above in reference to FIG. 1.

In STEP 268 according to one or more embodiments, the new clusters are added to the last target as sub-clusters. The sub-clusters will receive a geometry of their own after the method returns to determine whether there are more clusters to divide in STEP 212. This step may be performed by the cluster engine (110) as described above in reference to FIG. 1.

In STEP 270 according to one or more embodiments, after finding a distance larger than the distance L2, the number of times STEP 260 occurs is stored in the memory and further determined if it is less than a predetermined maximum number of attempts T1. The predetermined maximum number of attempts T1 depends on the size of the ED and need not be determined by the user. This non-limiting definition includes other methods that would process EDs that can determine such value. This non-limiting definition also includes determining the value by a method performed remotely by another user or a machine learning method implemented on the method. This process will be performed every time STEP 260 returns a negative result (i.e., a distance larger than the predetermined distance length L2 is not found). In the event that the number of attempts is smaller than the maximum number of attempts T1, the method proceeds to create a new definition for the distance length L2 as denoted in STEP 272. In the event that the number of attempts is larger than the maximum number of attempts T1, the method proceeds determine the target as a block of text as denoted in STEP 274. This step may be performed by the ED engine in collaboration with the cluster engine (110) as described above in reference to FIG. 1.

In STEP 272 according to one or more embodiments, after a negative result from STEP 270, the method reduces the value of the distance length L2. This new value is assigned to reduce the current distance length L2 by a difference ΔL. The difference ΔL, similar to the maximum number of attempts T1, need not be determined by the user. This non-limiting definition includes other systems or methods that would process EDs that can determine such value. This non-limiting definition also includes determining the value by a system or method done remotely by another user or a machine learning system implemented on the method. After this process, the system returns to find a distance larger than the new definition of the length distance L2. This step may be performed by the ED engine (108) as described above in reference to FIG. 1.

In STEP 274 according to one or more embodiments, after a positive response from STEP 270, the method determines that the target is a block of text. The cluster processed in STEP 250, STEP 256, and STEP 270 are assigned as blocks of text before returning to the main loop of the method. This step may be performed by the cluster engine (110) as described above in reference to FIG. 1.

Figure 3A:
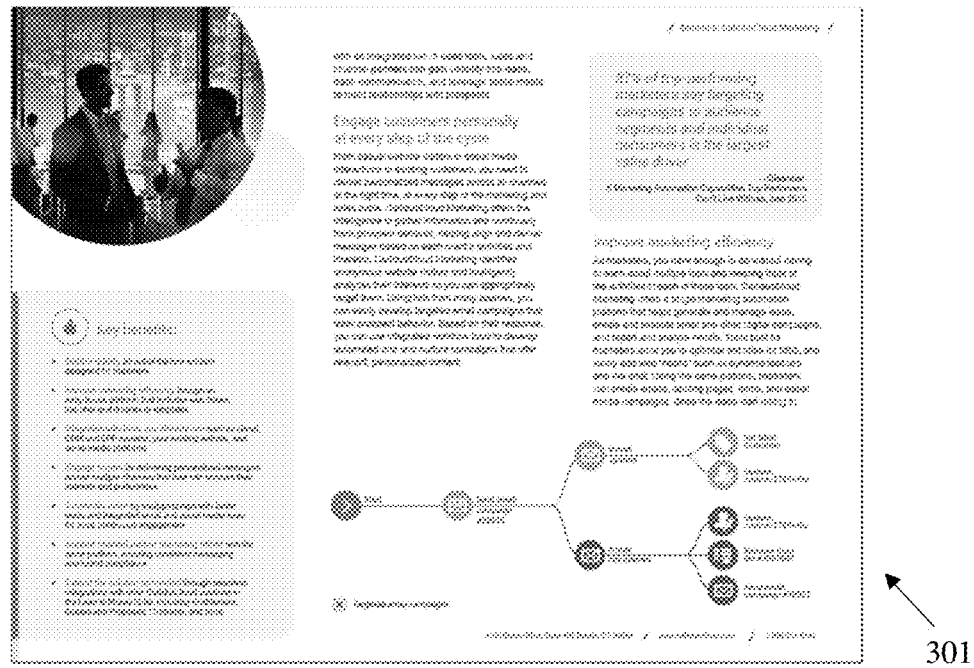
FIGS. 3A-3B show an implementation example in accordance with one or more embodiments of the invention.
Figure 3B:
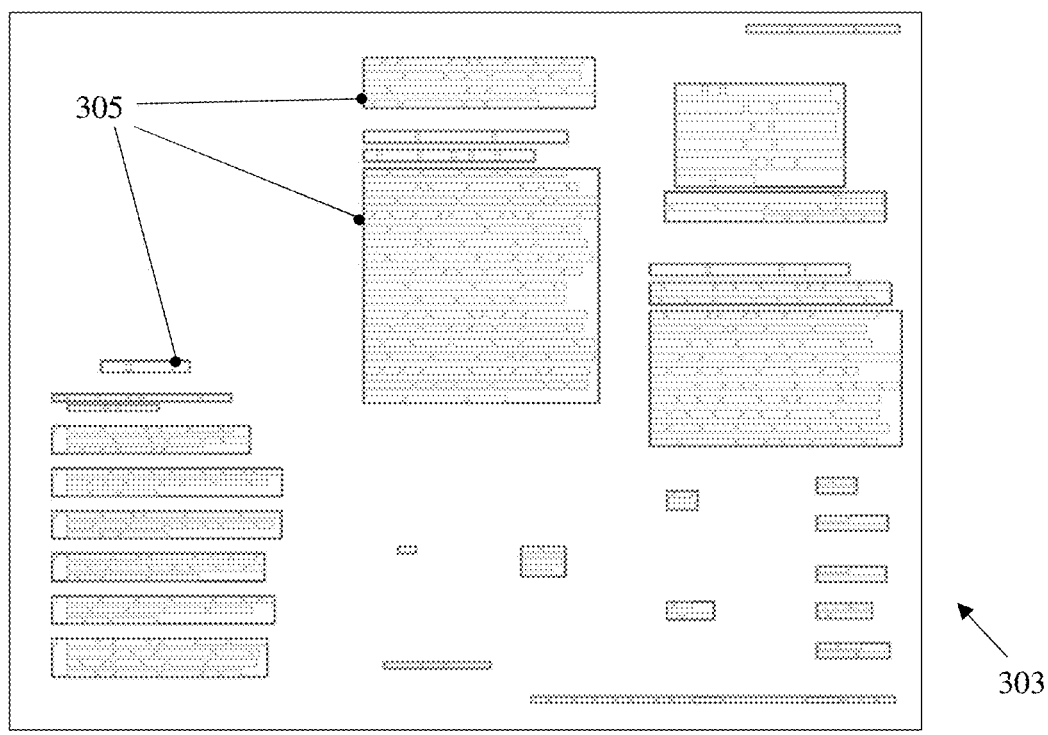

FIGS. 3A-3B an implementation example in accordance with one or more embodiments of the invention. FIG. 3A shows an example of an ED (301). As seen in FIG. 3A, the ED may include characters and text that are separated into various sections and paragraphs. FIG. 3B shows an example of an output (303) of the ED processing method as described above in FIGS. 2A and 2B. As seen in FIG. 3B, blocks of text (305) that make up the paragraphs and sections in the ED are identified and separated. Each block of text (305) include sub-blocks that represents the text and characters in the ED. It would be apparent to a person having ordinary skill in the art that, although only a selected few of the blocks of text (305) of labeled, each of the larger blocks in FIG. 3B that include the sub-blocks is a block of text (305).

Figure 4A:
FIGS. 4A-4B show an implementation example in accordance with one or more embodiments of the invention.
Figure 4B:
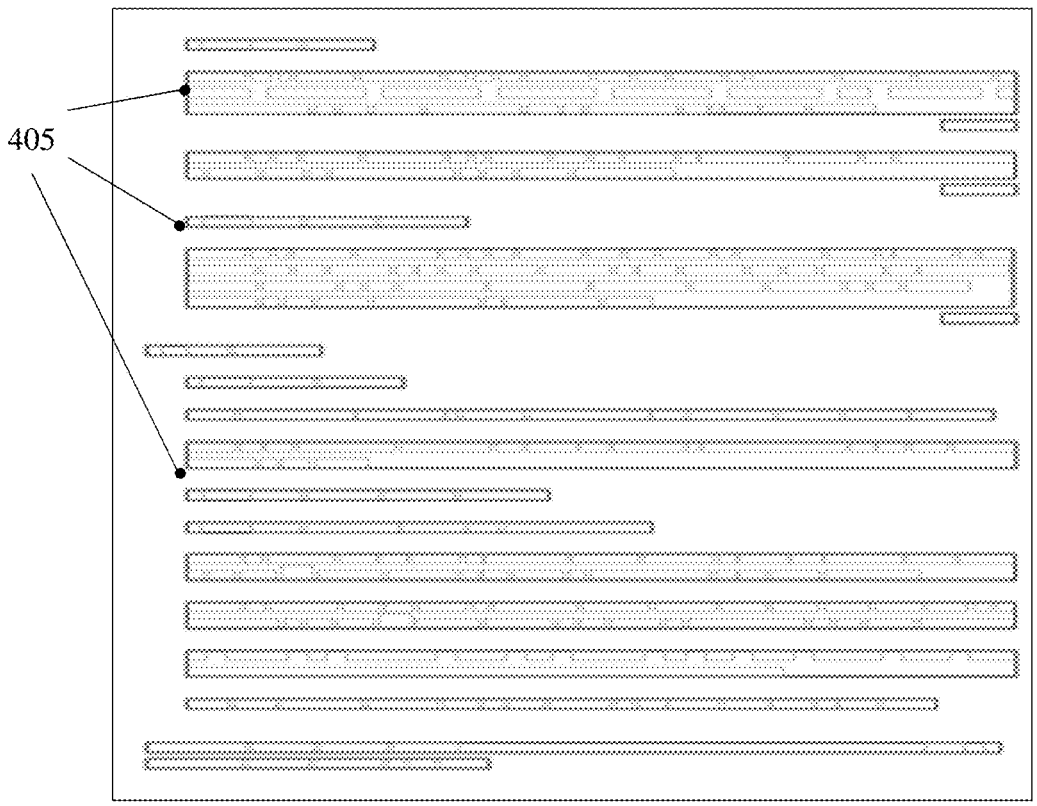

FIGS. 4A-4B show an implementation example in accordance with one or more embodiments of the invention. FIG. 4A shows an example of an ED (401). As seen in FIG. 4A, the ED may include characters and text that are separated into various sections and paragraphs. FIG. 4B shows an example of an output (403) of the ED processing method as described above in FIGS. 2A and 2B. As seen in FIG. 4B, blocks of text (405) that make up the paragraphs and sections in the ED are identified and separated. Each block of text (405) include sub-blocks that represents the text and characters in the ED. It would be apparent to a person having ordinary skill in the art that, although only a selected few of the blocks of text (405) are labeled, each of the larger blocks in FIG. 3B that include the sub-blocks is a block of text (405).

Figure 5A:
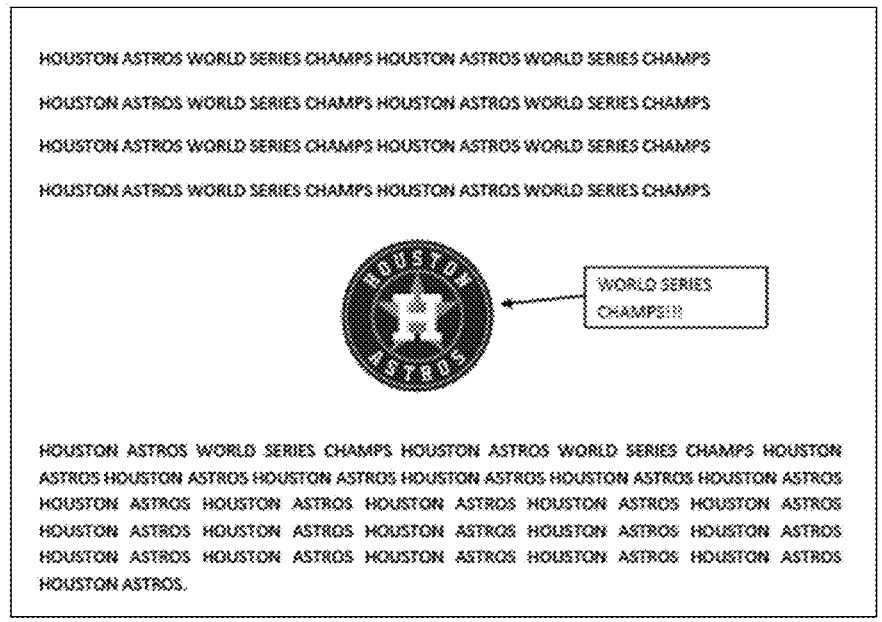
FIGS. 5A-5B show an implementation example in accordance with one or more embodiments of the invention.
Figure 5B:
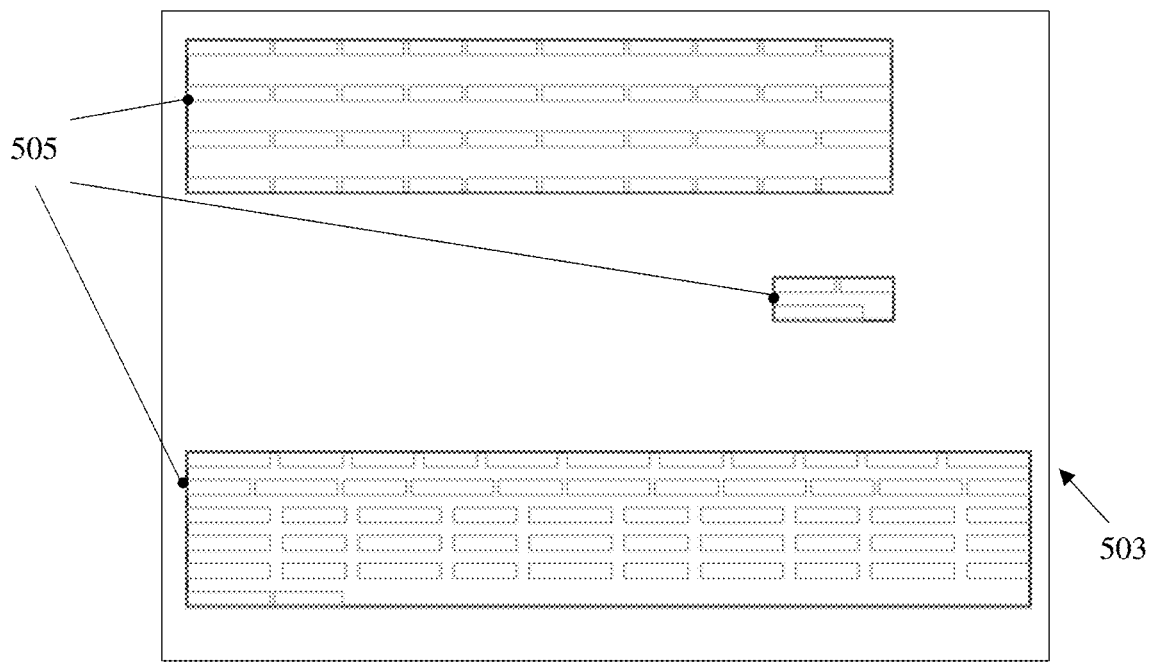
Figure 6:
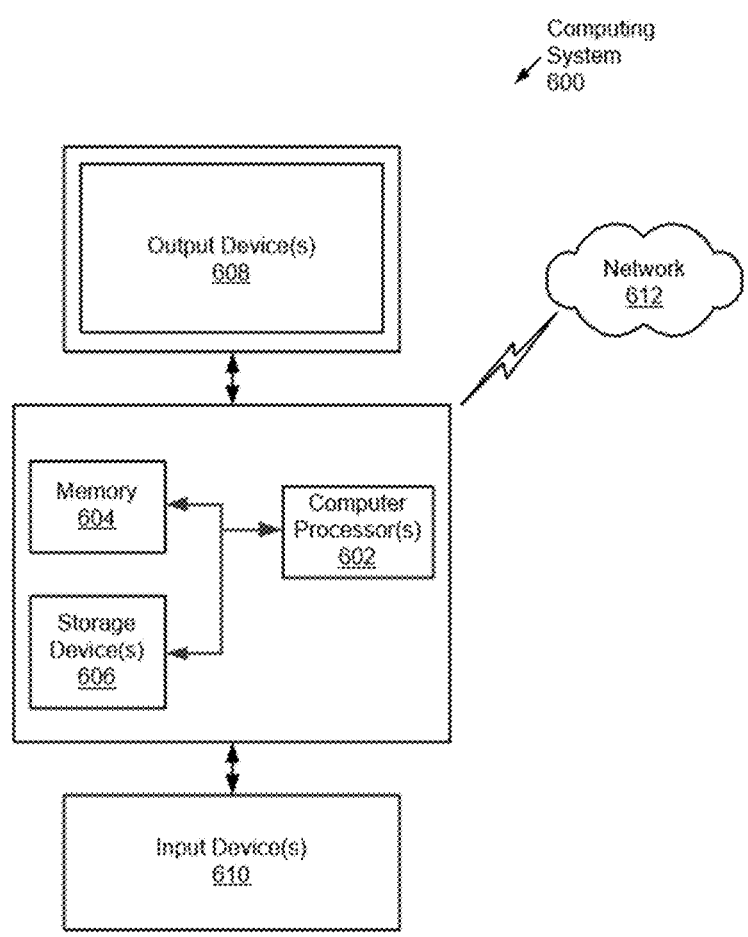
FIG. 6 shows a computing system in accordance with one or more embodiments of the invention.

FIGS. 5A-5B show an implementation example in accordance with one or more embodiments of the invention. FIG. 5A shows an example of an ED (501). As seen in FIG. 5A, the ED may include characters and text that are separated into various sections and paragraphs. FIG. 5B shows an example of an output (503) of the ED processing method as described above in FIGS. 2A and 2B. As seen in FIG. 5B, blocks of text (505) that make up the paragraphs and sections in the ED are identified and separated. Each block of text (505) include sub-blocks that represents the text and characters in the ED. It would be apparent to a person having ordinary skill in the art that, although only a selected few of the blocks of text (505) are labeled, each of the larger blocks in FIG. 3B that include the sub-blocks is a block of text (505).

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the present invention provide the capability to infer paragraphs from characters within an ED. Specifically, the original ED may include positioning information but no explicit paragraph indications. The ED may contain characters but no indication that the characters are grouped or arranged in any readable way. Advantageously, one or more embodiments of the invention obtain the ED and, through the steps disclosed above, generate a new ED containing paragraphs and sections that can be easily read and manipulated. In other words, one or more embodiments may group text into likely paragraphs and sections for the convenience of the user based on the initial location of the characters in an ED.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an electronic document including characters, the method comprising:
adjusting the characters to identify lines and words;
generating a cluster encompassing all of the lines and the words;
setting the cluster as a target;
calculating distances between the lines;
calculating a first standard deviation of the calculated distances;
comparing the first standard deviation of the calculated distances to a predetermined standard deviation;
in response to the first standard deviation being less than the predetermined standard deviation and none of the calculated distances between the lines being greater than a predetermined distance length,
dividing the target into a first plurality of sub-clusters;
identifying blocks of text based on the first plurality of sub-clusters; and
generating a new electronic document with paragraphs and sections based on the blocks of text.

2. The method of claim 1, further comprising:
determining, in response to dividing the target, whether a sub-cluster among the first sub-clusters can be further divided;
setting, in response to determining that the sub-cluster can be divided, the sub-cluster as the target;
dividing the target into a second plurality of sub-clusters; and
identifying the blocks of text based on the first and second sub-clusters.

3. The method of claim 2, wherein generating the new electronic document comprises:
identifying the blocks of text based on a number of times the target has been divided;
adding lines between the blocks of text to build the paragraphs and sections; and
collecting all the paragraphs and sections for the new electronic document.

4. The method of claim 1, wherein adjusting the characters comprises:

adding new whitespace characters between the characters to identify the lines and words; and determining, before generating the cluster, a geometry based on the lines and words.

5. The method of claim 4, further comprising:

determining whether the lines are consecutive;

determining whether the consecutive lines are uniformly spaced based on the calculated distances;

calculating measure-related values to be compared with the calculated distances; and assigning, before dividing the target, the measure-related values to the geometry of the target.

6. The method of claim 5, further comprising:

calculating a number of lines based on the geometry of the target;

assigning the calculated distances between the lines to the geometry of the target; and determining, based on the first standard deviation, a first maximum distance between the lines to identify the blocks of text.

7. The method of claim 6, wherein determining whether the target can be divided further comprises:

determining whether the calculated number of lines is greater than a predetermined line value, wherein calculating distances between the lines is in response to the calculated number of lines being greater than the predetermined line value.

8. The method of claim 6, wherein dividing the target into the first plurality of sub-clusters comprises:

setting a second standard deviation that is smaller than the first standard deviation;

determining, based on the second standard deviation, a second maximum distance between the lines to identify the blocks of text;

comparing the distances between the consecutive lines to the second maximum distance;

dividing the consecutive lines when the distance therebetween is equal to or greater than the second maximum distance;

identifying the divided clusters as the plurality of first sub-clusters;

removing the geometry associated to the target; and assigning the geometry to one of the first sub-clusters.

9. The method of claim 6, wherein comparing the first standard deviation of the distances to the predetermined maximum distance comprises:

determining whether a number of times that the calculated distances between the lines have been compared to the second maximum distance exceeds a first predetermined comparison number; and in response to determining that the number of times exceeds the first predetermined comparison number, reducing the second maximum distance.

10. The method of claim 1, wherein identifying blocks of text based on the first sub-clusters comprises:

setting the target as a processed cluster;

comparing a number of lines in the processed cluster to a predetermined value; and based on the comparison, setting the processed cluster as one of the blocks of text.

11. A non-transitory computer readable medium (CRM) storing computer readable program code for processing an electronic document including characters, wherein the program code causes a computer to execute:

adjusting the characters to identify lines and words;

generating a cluster encompassing all of the lines and the words;

setting the cluster as a target;

calculating distances between the lines;

calculating a first standard deviation of the calculated distances;

comparing the first standard deviation of the calculated distances to a predetermined standard deviation;

in response to the first standard deviation being less than the predetermined standard deviation and none of the calculated distances between the lines being greater than a predetermined distance length, dividing the target into a first plurality of sub-clusters;

identifying blocks of text based on the first plurality of sub-clusters; and generating a new electronic document with paragraphs and sections based on the blocks of text.

12. The non-transitory CRM of claim 11, wherein the program code causes the computer to further execute:

determining, in response to dividing the target, whether a sub-cluster among the first sub-clusters can be further divided;

setting, in response to determining that the sub-cluster can be divided, the sub-cluster as the target;

dividing the target into a second plurality of sub-clusters; and identifying the blocks of text based on the first and second sub-clusters.

13. The non-transitory CRM of claim 11, wherein adjusting the characters comprises:

adding new whitespace characters between the characters to identify the lines and words; and determining, before generating the cluster, a geometry based on the lines and words.

14. The non-transitory CRM of claim 13, further comprising:

determining whether the lines are consecutive;

determining whether the consecutive lines are uniformly spaced based on the calculated distances;

calculating measure-related values to be compared with the calculated distances; and assigning, before dividing the target, the measure-related values to the geometry of the target.

15. The non-transitory CRM of claim 14, further comprising:

calculating a number of lines based on the geometry of the target;

assigning the calculated distances between the lines to the geometry of the target; and determining, based on the first standard deviation, a first maximum distance between the lines to identify the blocks of text.

16. A system for image processing, comprising:

a memory; and a processor connected to the memory that:

adjusts the characters to identify lines and words;

generates a cluster encompassing all of the lines and the words;

sets the cluster as a target;

calculates distances between the lines;

calculates a first standard deviation of the calculated distances;

compares the first standard deviation of the calculated distances to a predetermined standard deviation;

in response to the first standard deviation being less than the predetermined standard deviation and none of the calculated distances between the lines being greater than a predetermined distance length, divides the target into a first plurality of sub-clusters;

identifies blocks of text based on the first plurality of sub-clusters; and generates a new electronic document with paragraphs and sections based on the blocks of text.

17. The system of claim 16, wherein the processor further:

determines, in response to dividing the target, whether a sub-cluster among the first sub-clusters can be further divided;

sets, in response to determining that the sub-cluster can be divided, the sub-cluster as the target;

divides the target into a second plurality of sub-clusters; and identifies the blocks of text based on the first and second sub-clusters.

18. The system of claim 16, wherein the characters adjusted by the processor further:

adds new whitespace characters between the characters to identify the lines and words; and determines, before generating the cluster, a geometry based on the lines and words.

19. The system of claim 18, wherein the processor further:

determines whether the lines are consecutive;

determines whether the consecutive lines are uniformly spaced based on the calculated distances;

calculates measure-related values to be compared with the calculated distances; and assigns, before dividing the target, the measure-related values to the geometry of the target.

20. The system of claim 19, wherein the processor further:

calculates a number of lines based on the geometry of the target;

assigns the calculated distances between the lines to the geometry of the target; and determines, based on the first standard deviation, a first maximum distance between the lines to identify the blocks of text.

\* \* \* \* \*